(12) United States Patent
Matschl et al.

(10) Patent No.: US 7,997,617 B2
(45) Date of Patent: Aug. 16, 2011

(54) STEERING ASSEMBLY

(75) Inventors: Gerald Matschl, Mattighofen (AT); Torbjörn Gustafson, Berndorf (AT)

(73) Assignee: KTM Sportmotorcycle AG, Mattighofen (AT)

( * ) Notice: Subject to any disclaimer, the term of this patent is extended or adjusted under 35 U.S.C. 154(b) by 329 days.

(21) Appl. No.: 12/151,007

(22) Filed: May 2, 2008

(65) Prior Publication Data

US 2008/0272568 A1 Nov. 6, 2008

(30) Foreign Application Priority Data

May 2, 2007 (DE) .................. 10 2007 020 580

(51) Int. Cl.
*B62D 1/18* (2006.01)
(52) U.S. Cl. ..................................... 280/775
(58) Field of Classification Search .................. 280/775, 280/778, 779, 771
See application file for complete search history.

(56) References Cited

U.S. PATENT DOCUMENTS

| | | |
|---|---|---|
| 4,667,765 A | 5/1987 | Tomoyuki |
| 4,749,205 A | 6/1988 | Takahashi et al. |
| 5,931,049 A | 8/1999 | Tsai |
| 6,767,022 B1 | 7/2004 | Chevalier |
| 2005/0077100 A1 | 4/2005 | Hasegawa |

FOREIGN PATENT DOCUMENTS

| | | |
|---|---|---|
| DE | 27 10 651 A1 | 9/1978 |
| DE | 200 09 433 U1 | 11/2001 |
| EP | 1 707 483 A | 10/2006 |
| JP | 10-024884 A | 1/1998 |
| JP | 2004-122862 | 4/2004 |
| JP | 2005-014675 | 1/2005 |
| WO | WO 89/09156 A1 | 10/1989 |

*Primary Examiner* — Faye M. Fleming
(74) *Attorney, Agent, or Firm* — Rod D. Baker (57) ABSTRACT

There is disclosed a steering assembly for a two-track vehicle, such as an all-terrain vehicle (ATV), including a rider saddle and vehicle frame, the steering assembly comprising arranged on a steering column (14) a handle bar bridge (10) and a handle bar (2) and provided at the steering column (14) a steering arm (20) coupled by tie rods (31) to transmit a rotary motion of the steering column (14) to the vehicle wheels (26), and the handle bar bridge (10) and the steering arm (20) are defined by means of a releasable connection to the steering column (14) and provided at the steering arm (20) is an extension arm (23) for coupling with a steering damper (25).

22 Claims, 6 Drawing Sheets

STEERING ASSEMBLY

CROSS-REFERENCE TO RELATED APPLICATIONS

This application claims priority to German Patent Application No. DE 10 2007 020 580.7, filed on May 2, 2007, the entirety of which is incorporated herein by reference.

BACKGROUND OF THE INVENTION

1. Field of the Invention

The present invention relates to a steering assemblies, particularly steering assemblies for two-track vehicles such as all-terrain vehicles.

2. Background Art

Two-track vehicles normally include a rider saddle and a vehicle frame, along with a steering assembly that features, on a steering column, a handle bar bridge and a handle bar. There also is provided on the steering column a steering arm coupled to the vehicle wheels by tie rods, thereby to transmit to the wheels a rotary motion of the steering column.

The aforementioned vehicle having a rider saddle may be a four-wheeled all-terrain vehicle (ATV) steered by means of a handle bar, the swivel movements of which are transmitted via a handle bar bridge to a steering column. Provided at or near the distal end of the steering column, opposite the handle bar, is a steering arm engaging the tie rods so that swiveling the handle bar ultimately causes a rotation of the steering column. This rotation of the steering column is transmitted via the steering arm to the tie rods, and by these to the wheels of the vehicle.

When such an ATV is negotiating rough terrain or a paved surface, whereby steering efforts are transmitted from the saddle rider to the handle bar, it may be desirable to provide a so-called steering damper on the vehicle. A steering damper ensures that unwanted jerky steering efforts exerted on the handle bar are not transmitted to the vehicle wheels, and that shocks coming from the latter back to the steering column tending to change the driving direction, don't cause a sudden change in the driving direction of the generic vehicle.

Known generic vehicles feature a steering assembly configured as a welded structure, in which the handle bar bridge is welded to the steering column and likewise the steering arm is welded to the steering column. These components are made of steel and are thus inherently massive. When a steering damper is applied to such a vehicle, the steering damper, for example, a rotational steering damper, is secured to tubular components of the vehicle frame by a clamp connection, since known such vehicles have no separate means for mounting the steering damper. Correspondingly, a clamp fit is applied to the steering column of the vehicle at which an extension arm is provided connected via an arm to an arm provided with a rotational steering damper. When the vehicle provided with a steering damper is negotiating rough terrain, its frame thus being exposed to shock loads, the cited clamp connections can work loose which, of course, is not wanted.

Further, it is not provided for on a vehicle configured as such to simply modify the vertical position of the handle bar since the welded structure as described is unsuitable for this.

A vehicle is also already known which features a steering column of aluminium, likewise a steering arm made of aluminium and welded to the steering column. But in such instances, when securing the steering arm to the steering column thermal distortion occurs during welding, which can only be counteracted by complicated means. In conclusion, a generic vehicle is already known having a steering arm of forged steel which can be connected by it being bolted to the steering column by a clamp connection.

Where a welded structure is concerned, the steering assemblies known in the art have the drawback of being heavy, and when using an aluminium material involve complicated steps in working. Further, they are not designed for a simple arrangement of a steering damper and avoiding the risk of becoming loose when the vehicle is operated under harsh competition conditions. In addition, the vertical position of the handle bar cannot be modified with the cited steering assemblies without involving complications.

Known from JP 2005014675 A is a steering column for a vehicle with a rider saddle, the vehicle comprising a steering damper integrated in the steering column. When it is wanted to operate the vehicle without such a steering assembly, the known steering column cannot be used in this case.

Known from JP 10024884 A is a steering assembly with a handle bar securable via a handle bar bridge to a front wheel fork and the position of the handle bar can be set in the longitudinal direction of the vehicle.

Known from WO 89/09156 A1 is a steering assembly for a bicycle enabling the position of the handle bar to be changed relative to the longitudinal direction of the bicycle.

Known from U.S. Pat. No. 5,931,049 is a means for adjusting the handle bar of a bicycle, wherein the spacing of the handle bar relative to the seating position of the rider can be changed by setting the angle of a mount pivotally located on a yoke, this change simultaneously changing the height of the handle bar.

Known from DE 200 09 433 U1 is a device for positioning a steering member on a steering fork, enabling the position of the handle bar to be changed relative to the longitudinal direction of the vehicle.

Known in conclusion from JP 2004122862 A is a handle bar assembly structure for a vehicle enabling the position of the handle bar to be changed relative to the longitudinal direction of the vehicle.

With the foregoing background, the present invention was developed with an object of providing a steering assembly for a two-track vehicle including a rider saddle and vehicle frame which enables the position of the handle bar to be adjusted relative to the rider saddle in both the longitudinal direction and yaw axis direction of the vehicle. A further object of the present invention is facilitating the provision of a steering damper which can be prevented from becoming divorced from the vehicle whilst being integrated in the overall appearance of the vehicle.

SUMMARY OF THE INVENTION

There is disclosed hereby a steering assembly for a two-track vehicle including a rider saddle and vehicle frame. The steering assembly includes a handle bar bridge and a handle bar arranged on a steering column; a steering arm also is provided on the steering column, the steering arm coupled by tie rods to transmit a rotary motion of the steering column to the vehicle wheels. The handle bar bridge and the steering arm have a releasable connection to the steering column, and provided on the steering arm is an extension arm for coupling with a steering damper. The steering assembly provided for in accordance with the present disclosure thus suffices without welds. When it is needed to change the position of the handle bar relative to the rider saddle in the direction of the longitudinal centerline of the steering column, according to the present apparatus an existing steering column can be simply replaced by a steering column of different length comprising a height position modified in accordance with the wanted position of the handle bar relative to the rider saddle.

In addition, the disclosed releasable connection between the handle bar bridge and the steering column enables the selection of materials featuring high strength and low specific mass for the handle bar bridge and the steering arm, which no longer need to be welded, thus contributing to a reduction in overall weight of the vehicle. Provided now at the steering arm of the steering assembly, in accordance with the present disclosure, is an extension arm which, for example, can be coupled by means of a variable-length arm to a steering damper optionally provided on the vehicle. Thus, unlike known steering assemblies, no clamping bridge or the like needs to be secured to the steering column; instead, the steering damper can be coupled to the extension arm provided integrally on the steering arm.

For this purpose it is provided for in one aspect of the present disclosure that the steering damper can be attached to a mount on the vehicle frame, and coupled by means of a damper arm to the extension arm on the steering arm. In other words, the extension arm provided at the steering arm is connected to the steering damper by means of, for example, a variable-length arm whereby the steering damper can be defined at a mount provided on the vehicle frame. This in turn enables the vehicle user to combine, for example, steering dampers having differing damping characteristics with the steering assembly to take into account differences in the damping characteristics, depending on the particular application of the vehicle whilst making it fast and easy to fit and/or remove the steering damper.

To make it possible to quickly change the position of the handle bar relative to the longitudinal direction of the vehicle, it is provided for in accordance with another aspect of the present disclosure that the handle bar is attached by a handle bar mount releasably connected to the handle bar bridge, and the position of the handle bar in the longitudinal direction of the vehicle, (e.g., the spacing from a predefined position on the rider saddle) can be varied by turning the handle bar bridge through 180 degrees relative to the steering column. This makes it possible—unlike on known steering assemblies comprising a weld between the handle bar bridge and the steering column—to quickly reposition the spacing of the handle bar in the longitudinal direction of the vehicle as predefined.

For this purpose, all that is required is to open releasable connections between the handle bar bridge and the steering column, and the handle bar bridge turned through 180 degrees relative to its former position at the steering column. The handle bar bridge features an eccentricity of the link between the handle bar mount and the handle bar bridge, facilitating repositioning the handle bar in the longitudinal direction of the vehicle.

As already mentioned above, the handle bar bridge is attached to the steering column by means of a releasable connection. This releasable connection may be a bolted connection for bolting the handle bar bridge to the steering column. For this purpose the steering column may feature tappings located spaced away from each other so that by connecting the handle bar bridge to the steering column via various tappings defined in the steering column, it is now possible to reposition the handle bar bridge relative to the steering column—thus enabling the position of the handle bar bridge at the steering column to be adjusted axially.

Via the steering column, the torsional forces applied by means of the handle bar are transmitted to the steering arm. For this purpose, it is provided for in accordance with yet another aspect of the present disclosure that the steering column is provided with a positive lock profile, and the steering arm provided with a complementary lock profile releasably engageable (e.g., insertable) with the positive lock profile. This positive lock profile makes for a plug-in connection between the steering arm and the steering column, ensuring reliable transmission of torsional forces between the steering column and the steering arm.

In accordance with another aspect of the present disclosure, this positive lock connection may be a clamping fit connection between the steering arm and the steering column. In this arrangement it may also be provided for that in addition to the clamping fit connection between the steering arm and the steering column, a bolted connection is provided to prevent unintentional release of the steering arm at the steering column.

As already mentioned above, the extension arm provided for linking the steering damper to the steering assembly may be configured integrally with the steering arm. This steering arm may be forged from an aluminium material designated EN AW-7075 or AlZnMgCu1.5.

The steering assembly in accordance with the present disclosure can be fitted and removed simply and quickly, it—unlike known steering assemblies—featuring no weld. The handle bar bridge is attached by a bolted connection to the steering column simultaneously featuring high torsional rigidity for transmitting torsional forces to the steering arm, whilst taking into account the weight-saving requirement. To meet these requirements, it is provided for in accordance with another aspect of the present disclosure that the steering column has an elongated design, with an axial interior tunnel configured to define a cruciform cross-section. The steering column thereby features a portion having a wall thickness greater than the wall thickness in an adjoining portion. At least one tapping is defined in the portion having the greater wall thickness, for connecting the handle bar bridge to the steering column. This results in the tapping being located in a cross-sectional portion of the steering column having a greater wall thickness than the adjoining portion designed to reduce the mass of the steering column. In another embodiment of the present disclosure the interior axial tunnel along the steering column may be configured cruciform, similar to a Maltese cross, and the aforementioned tapping for attaching the handle bar bridge is in that portion of the steering column having a wall thickness configured greater than in the adjoining portion.

To connect the handle bar bridge to the steering column, the handle bar bridge may comprise in accordance with the present disclosure a hole for forming a clamp fit, and be made of an aluminium material, particularly AlZn4.5Mg1. This also results in the handle bar bridge contributing towards speedy fitting/removal of the steering assembly in accordance with the present disclosure whilst reducing the mass of the steering assembly.

In accordance with yet another aspect of the present disclosure, it is provided for that the steering column is releasably attached to the vehicle frame by means of a bracket. The bracket has a sleeve bearing bush, so that the steering assembly can be quickly fitted to the vehicle. For this purpose the steering column is inserted through the sleeve bearing bush, after which the releasable connections between the steering column and the steering arm, and between the steering column and the handle bar bridge, respectively (each of which can be configured as a bolted connection), is tightened.

So as to handle the shock loads to which the vehicle fitted with the steering assembly is exposed, it is provided for in yet another aspect of the present disclosure that the handle bar bridge and the steering arm can each be connected to the steering column by means of a bolt extending in the longitudinal direction of the steering column. Thus, in addition to a clamp fit being used to secure the steering arm and the handle bar bridge to the steering column, a further releasable connection is provided between the handle bar bridge and the steering column, and between the steering arm and the steering column, respectively.

BRIEF DESCRIPTION OF THE DRAWINGS

The accompanying drawings, which are incorporated into and form a part of the specification, are for the purpose of illustrating a preferred embodiment of the apparatus, and are not to be construed as limiting the invention. The present disclosure will now be detailed with reference to the drawings, in which.

DESCRIPTION OF THE PREFERRED EMBODIMENTS

Best Mode for Practicing the Invention

Figure 1:
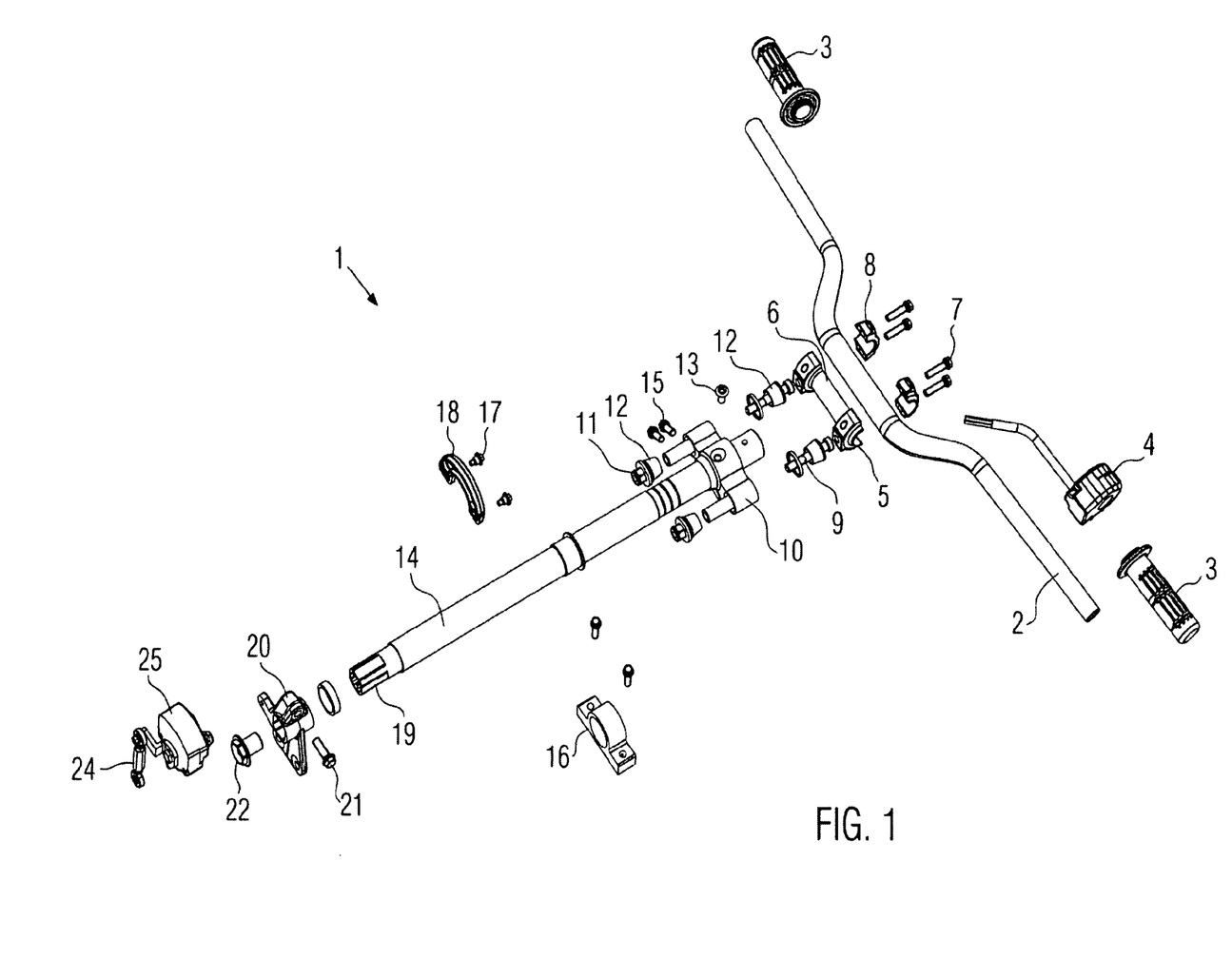
FIG. 1 is an exploded view, in perspective, of one embodiment of a steering assembly in accordance with the present disclosure.

Referring now to FIG. 1, there is illustrated an embodiment of a steering assembly 1 in accordance with the present disclosure, shown as an exploded view in perspective. The handle bar 2 of the embodiment of the steering assembly 1, for arrangement on an ATV, may feature hand grips 3 and instruments 4 (shown diagrammatically) secured thereto.

The handle bar 2 is defined by a handle bar mount 5 on the steering assembly 1, the handle bar mount 5 featuring a mount 6 similar to a cut tubular portion, into which the handle bar 2 can be inserted and releasably retained by means of bolts 7 and fasteners 8. From the handle bar mount 5 are bolts 9 extending in the direction of a handle bar bridge 10, which are detailed with reference to FIG. 4 of the drawing. The bolts 9 pass through holes 36 in the handle bar bridge 10, and can be secured at their end portions, opposite the mount 6, by means of nuts 11. On both sides of the handle bar bridge 10 and on the bolts 9, are conical sleeve members 12 which are engageable with the holes 36 of the handle bar bridge 10.

Figure 5:
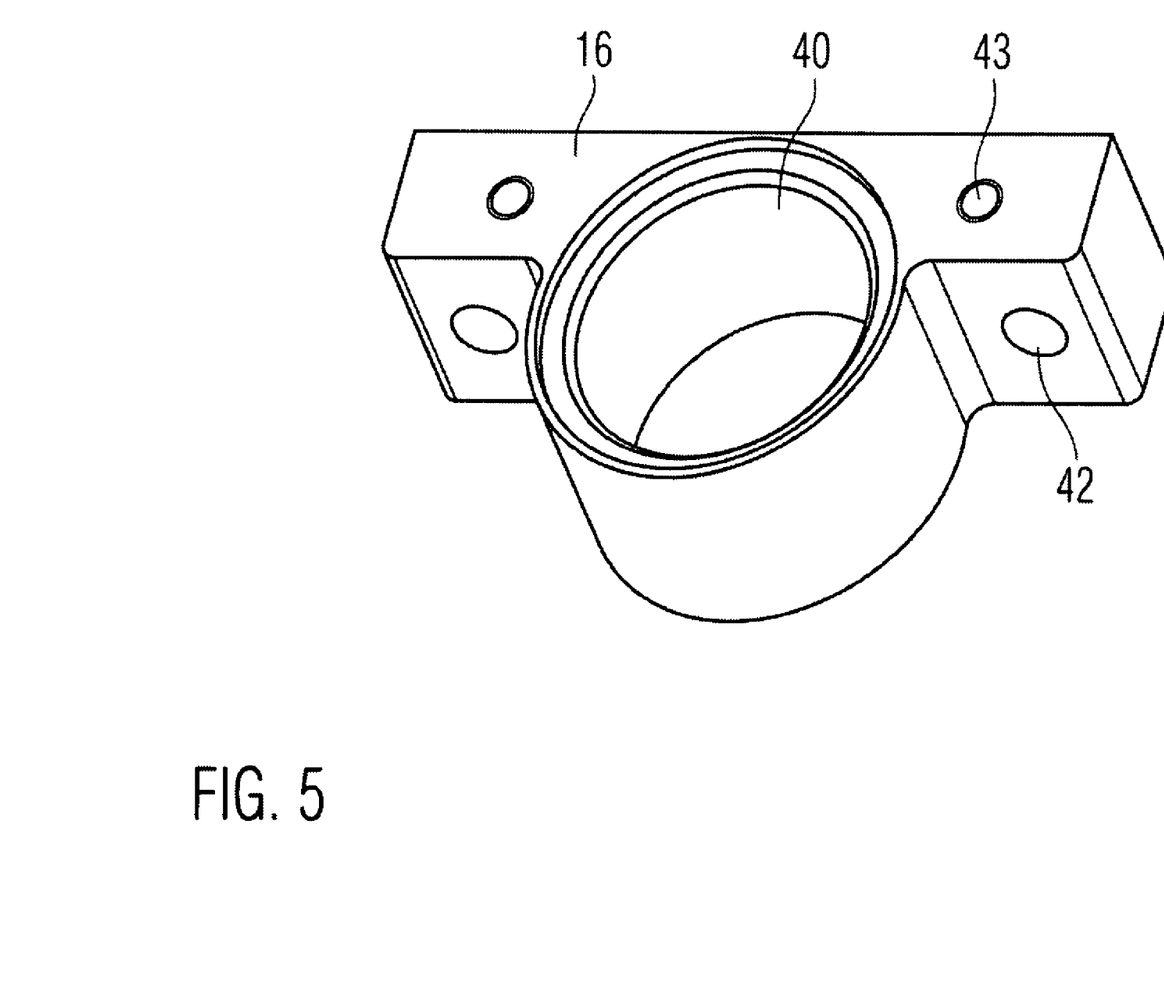
FIG. 5 is a view in perspective of a bracket mounting the steering assembly.

The handle bar bridge 10 is non-rotatably attached to the steering column 14 by a bolt 13 and a bolt 15. Via a bracket 16 (as shown in FIG. 5 in detail) comprising a sleeve bearing bush 40, the steering column 14 is rotatably connected to a vehicle frame 29. The cable guide 18 is secured on the bracket 16 via bolts 17. The guide 18 serves to guide in the region of the steering column 14 the cables coming, for example, from instruments 4 at the handle bar 2.

At the end portion opposite the handle bar 2, the steering column 14 defines a positive lock profile 19, preferably in the form of a square profile, for releasably engaging a steering arm 20. The steering arm 20 likewise is provided with a complementary profile (also preferably having a square configuration, as detailed in FIG. 6). The connection is further via a bolt 21 and a bolt 22 extending in the longitudinal direction of the steering column 14.

Figure 6:
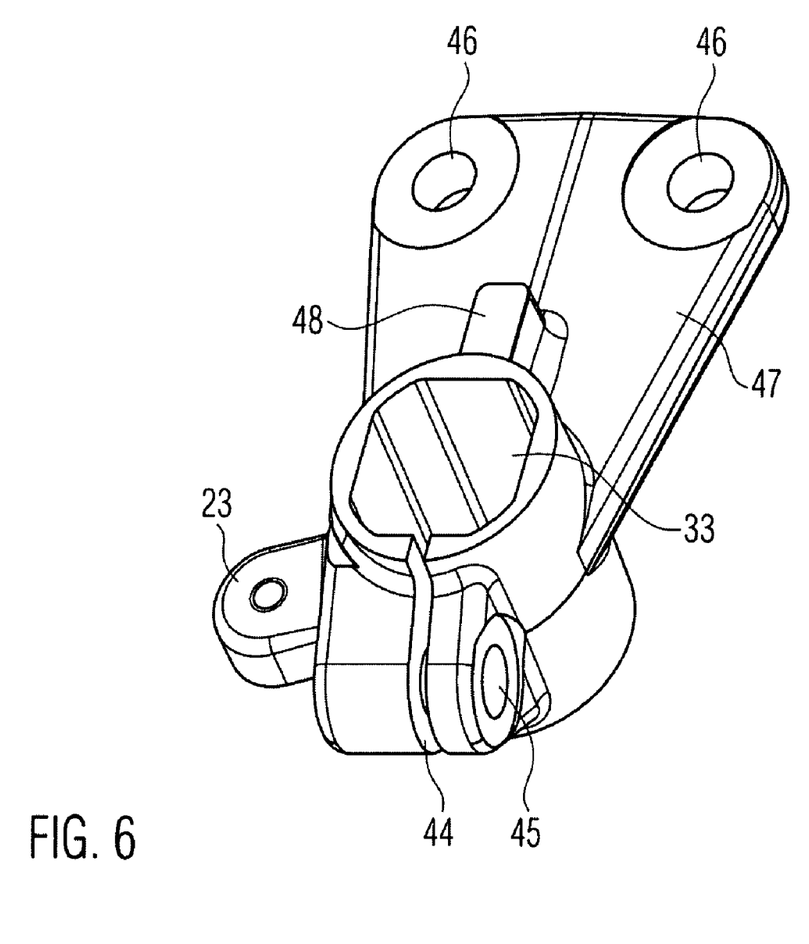
FIG. 6 is a perspective view of the steering arm of the steering assembly according to the present disclosure.

Configured integral with the steering arm 20 is an extension arm 23 (again as shown in FIG. 6 of the drawing in more detail), at which a rotational steering damper 25 is attached via a length-adjustable damper arm 24.

Figure 2:
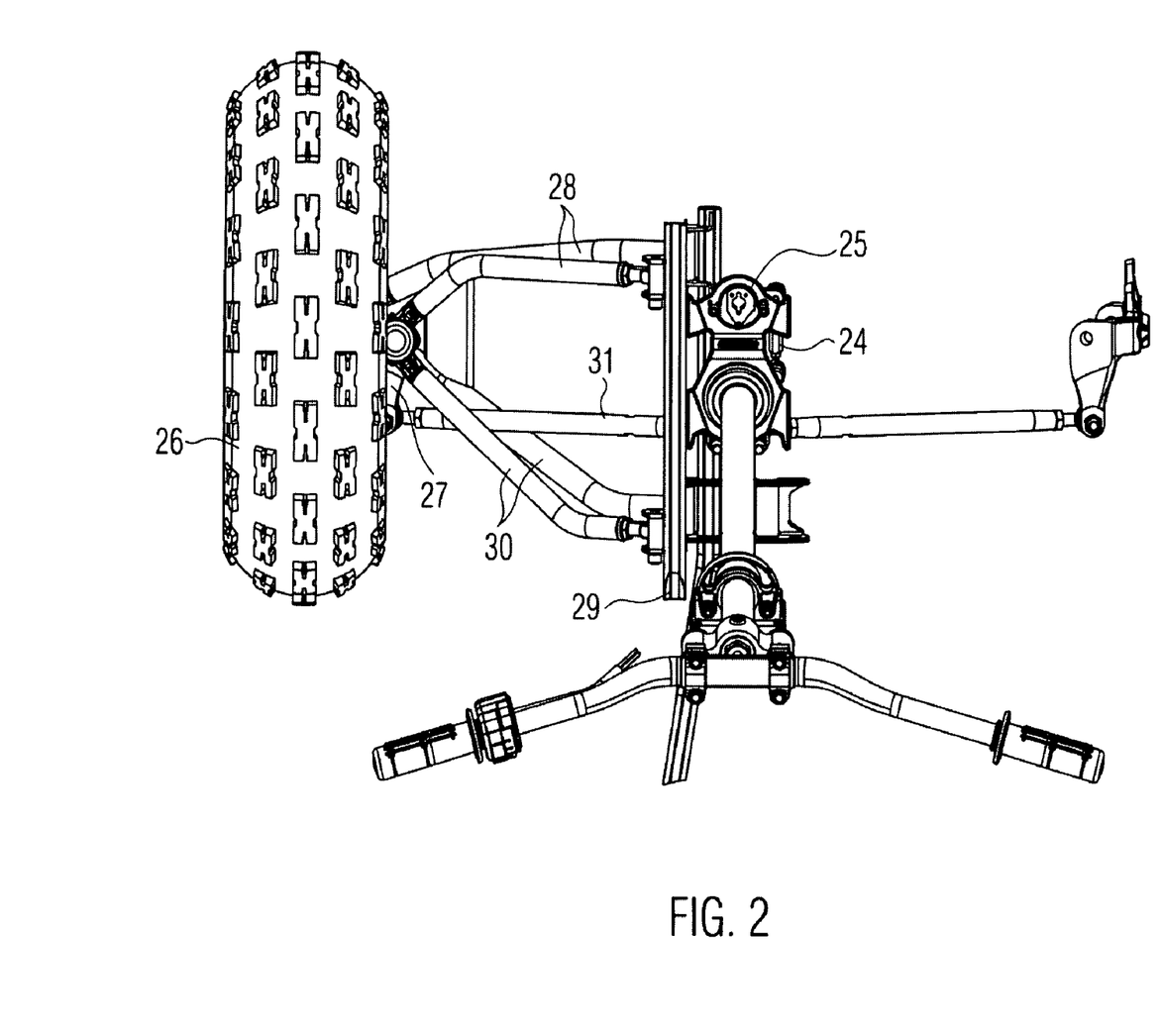
FIG. 2 is a plan view of the steering assembly as fitted on a vehicle frame of an ATV.

Referring now to FIG. 2 of the drawing, there is illustrated in a top-down view a left-hand front vehicle wheel 26 of the ATV, guided by a wheel carrier 27 connected to a vehicle frame 29 by means of control arms 28 and 30 via ball joints (not shown). A spring damper unit (not shown) likewise connected to the vehicle frame 29 serves to dampen spring and shock forces. Engaging the wheel carrier 27 via a ball joint is a tie rod 31 which extends away from the wheel carrier 27 in the direction of the steering arm 20. Tie rod 31 is releasably attached to the steering arm 20 by means of a ball joint and a bolted connection. The rotational steering damper 25 is secured by bolts to a sheet metal mount which is on the vehicle frame 29. Also evident from FIG. 2 is the damper arm 24, which extends from the rotational steering damper 25 to the extension arm 23 (see FIG. 6 of the drawing for more details) at the steering arm 20.

Figure 3A:
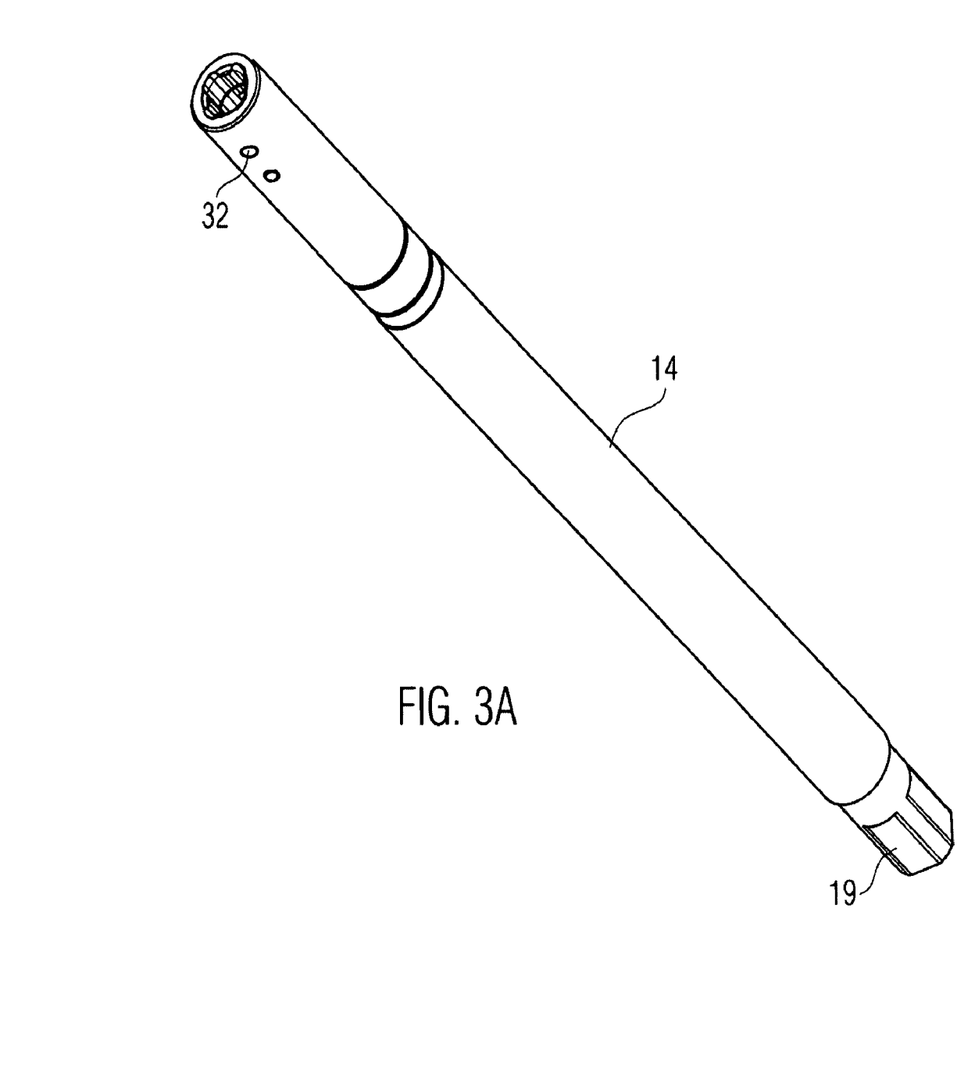
FIG. 3A is a perspective view of the steering column.

Referring now to FIG. 3A, there is illustrated in perspective how the steering column 14 has a hole tapping 32 into which the bolt 13 (FIG. 1) can be screwed. The steering column 14 may also feature a second or more tappings to permit positional adjustments of the handle bar 2, permitting the setting the height of the handle bar 2 relative to the rider saddle or vehicle frame.

Configured at the end portion of the steering column 14, opposite the tapping 32, is the positive lock profile 19 designed for positively connecting the steering arm 20, which has a complementary (e.g. square) profile 33. The steering column 14 can extend lengthwise differingly, depending on the spacing of the handle bar 2 relative to the rider saddle or vehicle frame of the ATV rider. Since the steering is not configured by the components being welded together, fitting and removing the steering column 14, for instance to replace it by a steering column 14 having another lengthwise extension, is quick and easy.

Figure 3B:
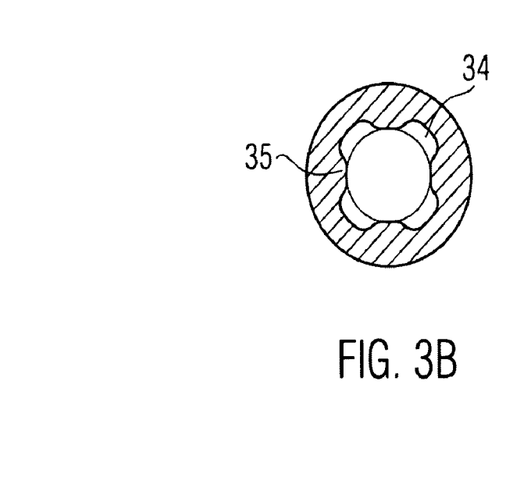
FIG. 3B is a section view taken radially through the steering column.

Referring now to FIG. 3B, there is illustrated a cross-sectional view through the steering column, with a hole 34 defining as shown like a cruciform similar to a Maltese cross. The tapping 32 preferably is defined through a portion 35 of the column 14 having a wall thickness greater than the wall thickness in either circumferentially adjacent portion of the steering column 14. The portions 35 having the larger cross-section than in the adjoining portions have, near one end of the steering column 14, a female thread defined therein designed to screwably receive the bolt 22 (as shown in FIG. 1) for locating the steering arm 20, and near the opposite of the steering column 14 a female threaded tap and bolt 13 for connecting the handle bar bridge 10, respectively.

Figure 4:
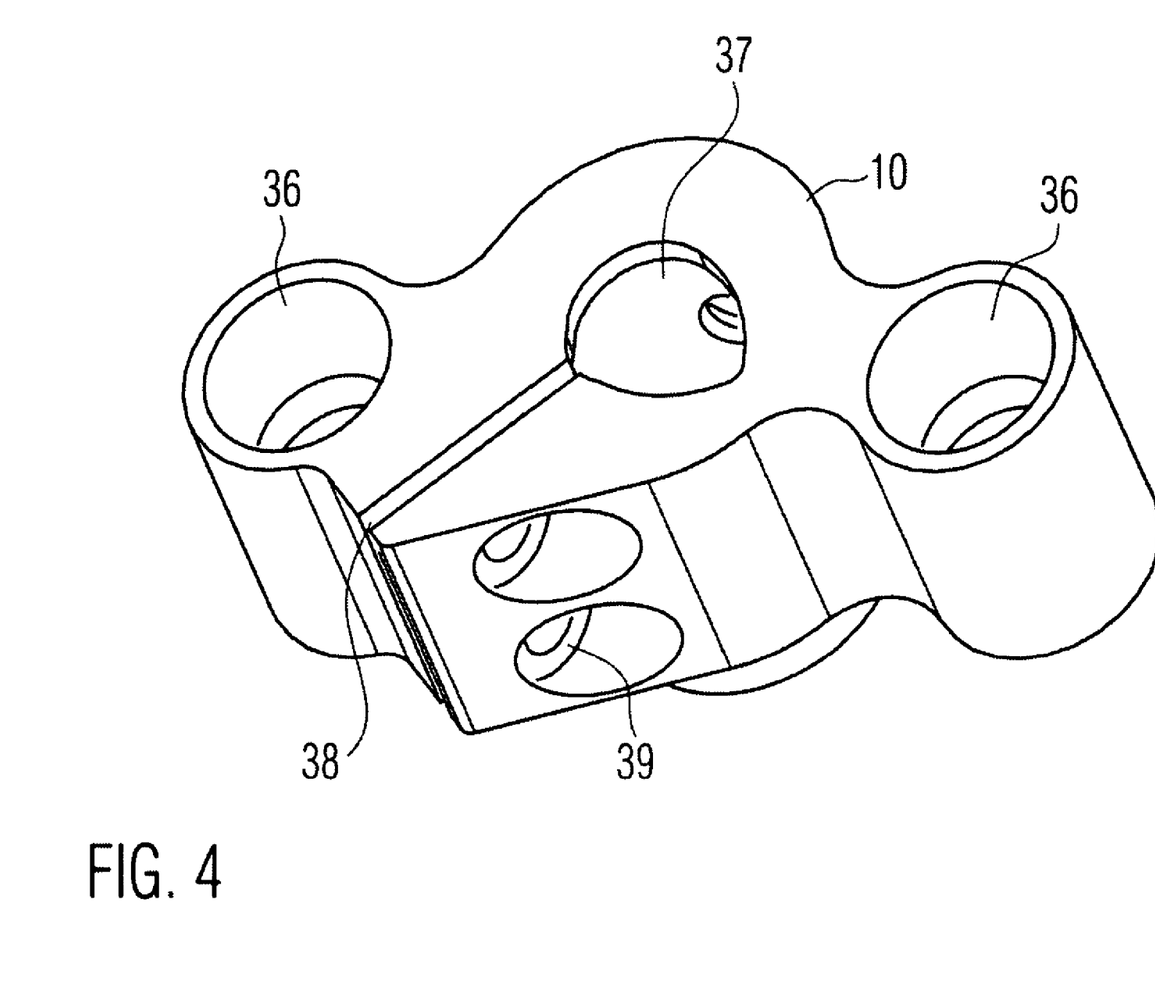
FIG. 4 is view in perspective of a handle bar bridge of the steering assembly.

Referring now to FIG. 4 there is illustrated how the handle bar bridge 10 features holes 36 through which the bolts 9 pass. In addition the handle bar bridge 10 also features a hole 37 configured non-circular which, together with a clamping slot 38, forms a clamp fit so that the handle bar bridge 10 can be releasably defined at the steering column 14 by the bolts 15 for inserting into the holes 39.

Referring now to FIG. 5, there is illustrated how the bracket 16 as shown in FIG. 1 has a sleeve bearing bush 40 for rotatably mounting therein the steering column 14, such that the bracket is on a more remote portion of the steering column 14 as suggested in FIG. 3. The drillings 42 and 43 respectively serve, when in proper registration, to connect the bracket 16 to the vehicle frame 29, and the cable guide 18 to the bracket 16, respectively.

Referring now to FIG. 6 of the drawing, there is illustrated in perspective the steering arm 20, preferably forged from an aluminium alloy, most preferably material AW-7075 (AlZn-MgCu1.5). The steering arm 20 features the complementary profile 33, as already described, for engaging the steering arm 20 with the positive lock profile 19 of the steering column 14. In this arrangement, the steering arm 20 is pushed from one (ordinarily the distal) end of the steering column 14, over the positive lock profile 19, and is then releasably connected, by its configuration as a clamp fit (with a clamping slot 44 and a drilling 45 in the bolt 21 as shown in FIG. 1), to the steering column 14. The rotational steering damper 25 is releasably attached to the extension arm 23, which is configured integrally with the steering arm 20, by the damper arm 24. The steering arm 20 has two drillings 46 in its pad 47, the pad configured similar to a delta-shaped plate, through which drillings the bolts pass, serving to releasably connect thereto the ball joints of the tie rod 31. A stop 48 serves to limit the steering angle, the stop 48 for this purpose coming up against the stops configured on the vehicle frame 29.

The steering assembly in accordance with the disclosure is designed for speedy fitting to and removal from the vehicle frame of an ATV, cited as an example, for replacing the steering column by another different in length. Moreover, the steering assembly in accordance with the present disclosure has a weight advantage over known steering assemblies because the steering arm, the steering column and the handle bar bridge and other components of the steering assembly may be made of aluminium alloys. The steering assembly thus contributes to reducing the weight of the vehicle as a whole. Because the steering assembly is made up of components releasably connected to one other, and requiring no welds for this purpose, the drawbacks associated with known steering assemblies as regards deformation due to weld distortion are now reliably avoided.

It is understood that as regards all features of the invention not explained above in detail reference is expressly made to the claims and the drawing.

| List of reference numerals: | |
|---|---|
| 1 | steering assembly |
| 2 | handle bar |
| 3 | hand grips |
| 4 | instruments |
| 5 | handle bar mount |
| 6 | mount |
| 7 | bolt |
| 8 | fastener |
| 9 | bolt |
| 10 | handle bar bridge |
| 11 | nuts |
| 12 | sleeve member |
| 13 | bolt |
| 14 | steering column |
| 15 | bolt |
| 16 | bracket |
| 17 | bolt |
| 18 | cable guide |
| 19 | square profile |
| 20 | steering arm |
| 21 | bolt |
| 22 | bolt |
| 23 | extension arm |
| 24 | damper arm |
| 25 | rotational steering damper |

-continued

| List of reference numerals: | |
|---|---|
| 26 | vehicle wheel |
| 27 | wheel carrier |
| 28 | control arm |
| 29 | vehicle frame |
| 30 | spring damper unit |
| 31 | tie rod |
| 32 | tapping |
| 33 | square profile |
| 34 | hole |
| 35 | portion |
| 36 | hole |
| 37 | hole |
| 38 | clamping slot |
| 39 | hole |
| 40 | sleeve bearing bush |
| 41 | portion |
| 42 | drilling |
| 43 | drilling |
| 44 | clamping slot |
| 45 | drilling |
| 46 | drilling |
| 47 | pad |
| 48 | stop |

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all patents and publications cited above are hereby incorporated by reference.

What is claimed is:

1. A steering assembly for a two-track vehicle including wheels, a rider saddle, and a vehicle frame, the steering assembly having a handle bar and a handle bar bridge arranged on a steering column, and the steering column having disposed thereon a steering arm coupled to tie rods for transmitting a rotary motion of the steering column to the vehicle wheels, wherein:
   the handle bar bridge and the steering arm both are releasably clamped to the steering column; and
   the steering arm has an extension arm thereon for coupling with a steering damper.

2. The steering assembly as set forth in claim 1, wherein the steering damper is fixable to a mount on the vehicle frame, and is connectable by a damper arm to the extension arm.

3. The steering assembly as set forth in claim 1, wherein:
   the handle bar is connected to a handle bar mount, the handle bar mount being releasably connected to the handle bar bridge; and
   a position of the handle bar, in relation to the longitudinal direction of the vehicle, is variable by turning the handle bar bridge through approximately 180 degrees relative to the steering column.

4. The steering assembly as set forth in claim 1, wherein the steering column defines a tapping therein, and the handle bar bridge is boltably connectable to the steering column by means of the tapping.

5. The steering assembly as set forth in claim 1, wherein the steering column comprises a positive lock profile, and the steering arm comprises a complementary profile, wherein the steering column and the steering arm are releasably connectable by engagement of the positive lock profile with the complementary profile.

6. The steering assembly as set forth in claim 1, wherein the steering arm is releasably connectable to the steering column by means of a clamp fit.

7. The steering assembly as set forth in claim 1, wherein the steering arm comprises forged aluminium alloy.

8. The steering assembly as set forth in claim 7, wherein the aluminium alloy comprises AlZnMgCu1.5.

9. The steering assembly as set forth in claim 1, wherein the steering column comprises an axial interior tunnel defining a cruciform cross-section, the steering column thereby comprising a portion having a wall thickness greater than the wall thickness in an adjoining portion, and further comprising at least one tapping, in the portion having the greater wall thickness, for connecting the handle bar bridge to the steering column.

10. The steering assembly as set forth in claim 1, wherein the handle bar bridge comprises an aluminium alloy and has a hole defined therein for providing a clamp fit to the steering column.

11. The steering assembly as set forth in claim 10, wherein the aluminium alloy comprises AlZn4.5Mg1.

12. The steering assembly as set forth in claim 1, further comprising a bracket, the bracket comprising a sleeve bearing bush, for releasably attaching the steering column to the vehicle frame.

13. The steering assembly as set forth in claim 1, wherein the handle bar bridge and the steering arm each is attachable to the steering column by means of a bolt extending in the longitudinal direction of the steering column.

14. The steering assembly as set forth in claim 1, wherein the steering column comprises an aluminium alloy.

15. The steering assembly as set forth in claim 14, wherein the aluminium alloy comprises AlZn4.5Mg1.

16. A steering assembly for a two-track vehicle including wheels, a rider saddle, and a vehicle frame, the steering assembly having a handle bar and a handle bar bridge arranged on a steering column, and the steering column having disposed thereon a steering arm coupled to tie rods for transmitting a rotary motion of the steering column to the vehicle wheels, wherein:
the handle bar bridge and the steering arm both are releasably clamped to the steering column;
the steering arm has an extension arm thereon for coupling with a steering damper;
the handle bar is connected to a handle bar mount, the handle bar mount being releasably connected to the handle bar bridge; and
a position of the handle bar, in relation to the longitudinal direction of the vehicle, is variable by turning the handle bar bridge through approximately 180 degrees relative to the steering column.

17. The steering assembly as set forth in claim 16, wherein the handle bar bridge comprises an aluminium alloy and has a hole defined therein for providing a clamp fit to the steering column.

18. The steering assembly as set forth in claim 17, wherein the steering column defines a tapping therein, and the handle bar bridge is boltably connectable to the steering column by means of the tapping.

19. The steering assembly as set forth in claim 18, wherein the steering column comprises a positive lock profile, and the steering arm comprises a complementary profile, wherein the steering column and the steering arm are releasably connectable by engagement of the positive lock profile with the complementary profile.

20. The steering assembly as set forth in claim 19, wherein the steering column comprises:
an aluminium alloy;
an axial interior tunnel defining a cruciform cross-section, the steering column thereby comprising a portion having a wall thickness greater than the wall thickness in an adjoining portion; and
at least one tapping, in the portion having the greater wall thickness, for connecting the handle bar bridge to the steering column.

21. A steering assembly for a two-track vehicle including wheels, a rider saddle, and a vehicle frame, the steering assembly having a handle bar and a handle bar bridge arranged on a steering column, and the steering column having disposed thereon a steering arm coupled to tie rods for transmitting a rotary motion of the steering column to the vehicle wheels, wherein:
the handle bar bridge and the steering arm both are releasably clamped to the steering column; and
the steering arm has an extension arm thereon for coupling with a steering damper;
wherein the steering column defines a tapping therein, and the handle bar bridge is boltably connectable to the steering column by means of the tapping.

22. A steering assembly for a two-track vehicle including wheels, a rider saddle, and a vehicle frame, the steering assembly having a handle bar and a handle bar bridge arranged on a steering column, and the steering column having disposed thereon a steering arm coupled to tie rods for transmitting a rotary motion of the steering column to the vehicle wheels, wherein:
the handle bar bridge and the steering arm both are releasably clamped to the steering column; and
the steering arm has an extension arm thereon for coupling with a steering damper;
wherein the handle bar bridge and the steering arm each is attachable to the steering column by means of a bolt extending in the longitudinal direction of the steering column.

* * * * *